(12) United States Patent
Tsubouchi et al.

(10) Patent No.: US 6,782,598 B2
(45) Date of Patent: Aug. 31, 2004

(54) METHOD OF MANUFACTURING HOLLOW RACK SHAFT

(75) Inventors: Akira Tsubouchi, Maebahshi (JP); Kiyoshi Okubo, Maebahshi (JP); Yasushi Watanabe, Maebahshi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/461,056

(22) Filed: Jun. 13, 2003

(65) Prior Publication Data

US 2003/0209100 A1 Nov. 13, 2003

Related U.S. Application Data

(62) Division of application No. 09/918,117, filed on Jul. 30, 2001.

(30) Foreign Application Priority Data

| Aug. 4, 2000 | (JP) | 2000-236982 |
| Sep. 6, 2000 | (JP) | 2000-269725 |
| Sep. 6, 2000 | (JP) | 2000-269915 |

(51) Int. Cl.⁷ .......................... B21D 35/00; B21D 53/28
(52) U.S. Cl. ................... 29/469.5; 29/893.34
(58) Field of Search ............... 29/469.5, 893, 29/893.3, 893.34; 74/422, 457; 72/370.21

(56) References Cited

U.S. PATENT DOCUMENTS

| 1,298,100 A | 3/1919 | Royce |
| 1,983,584 A | 12/1934 | Urschel .................. 29/153.1 |
| 2,762,117 A | 9/1956 | Houck ....................... 29/521 |
| 2,762,118 A | 9/1956 | Shaw et al. ................ 29/521 |
| 3,163,925 A | 1/1965 | Ulm ........................ 29/159.2 |
| 3,834,247 A | 9/1974 | Belsdorf et al. ............ 74/422 |
| 4,133,221 A | 1/1979 | Clary ........................ 74/498 |
| 4,538,647 A | 9/1985 | Saurenman et al. ......... 138/166 |
| 4,573,846 A | 3/1986 | Willbanks et al. ......... 414/24.6 |
| 4,907,626 A | 3/1990 | Mori ........................ 138/156 |
| 4,978,104 A | 12/1990 | Gipson, Jr. ................ 254/420 |
| 6,317,979 B1 | 11/2001 | Yamawaki ............... 29/893.34 |
| 6,442,992 B2 | 9/2002 | Tsubouchi et al. ....... 72/370.21 |

FOREIGN PATENT DOCUMENTS

| JP | 58-218339 A | 12/1983 |
| JP | 05-345231 A | 12/1993 |
| JP | 06-246379 A | 9/1994 |
| JP | 11-180318 A | 7/1999 |
| JP | 11-278287 A | 12/1999 |

*Primary Examiner*—John C. Hong
(74) *Attorney, Agent, or Firm*—Sidley Austin Brown & Wood LLP

(57) ABSTRACT

A workpiece for a hollow rack shaft is a substantially rectangular plate. The opposite two sides of this workpiece are respectively provided with a complementary profile composed of the continuation of a convex portion and a concave portion and when the workpiece is cylindrically formed, the profiles are mutually engaged. As the width of a part the width of which is the largest in the convex portion is larger than that of a part the width of which is the smallest in the concave portion, the two sides are prevented from being detached after engagement. Further, the opposite convex portion and concave portion are mutually caulked and hereby, mutual gap is removed.

15 Claims, 16 Drawing Sheets

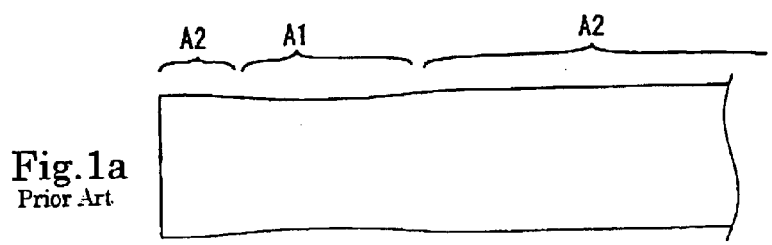
Fig.1a Prior Art
Fig.1b Prior Art
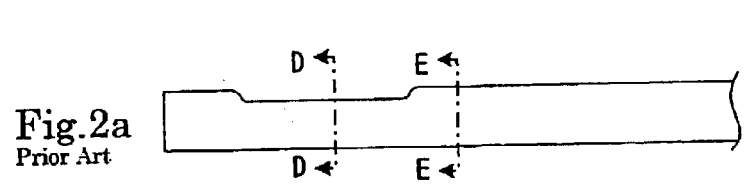
Fig.2a Prior Art
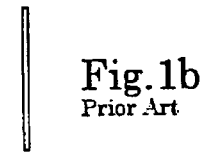
Fig.2b Prior Art  Fig.2c Prior Art
D-D  E-E
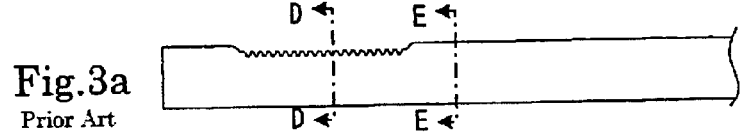
Fig.3a Prior Art
 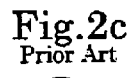
Fig.3b Prior Art  Fig.3c Prior Art
D-D  E-E
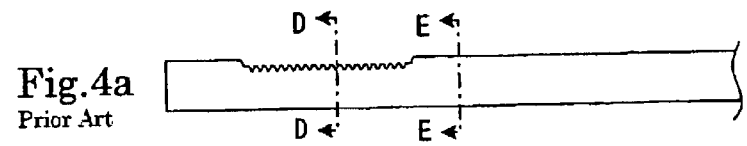
Fig.4a Prior Art
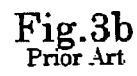 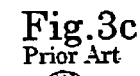
Fig.4b Prior Art  Fig.4c Prior Art
D-D  E-E
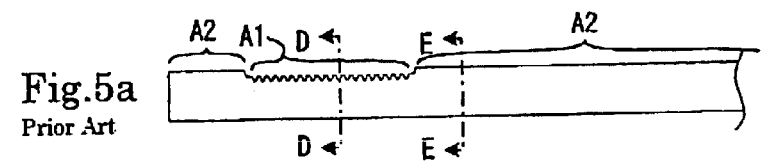
Fig.5a Prior Art
 
Fig.5b Prior Art  Fig.5c Prior Art
D-D  E-E
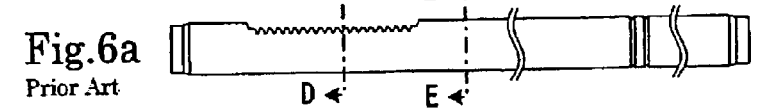
Fig.6a Prior Art
 
Fig.6b Prior Art  Fig.6c Prior Art
D-D  E-E
 

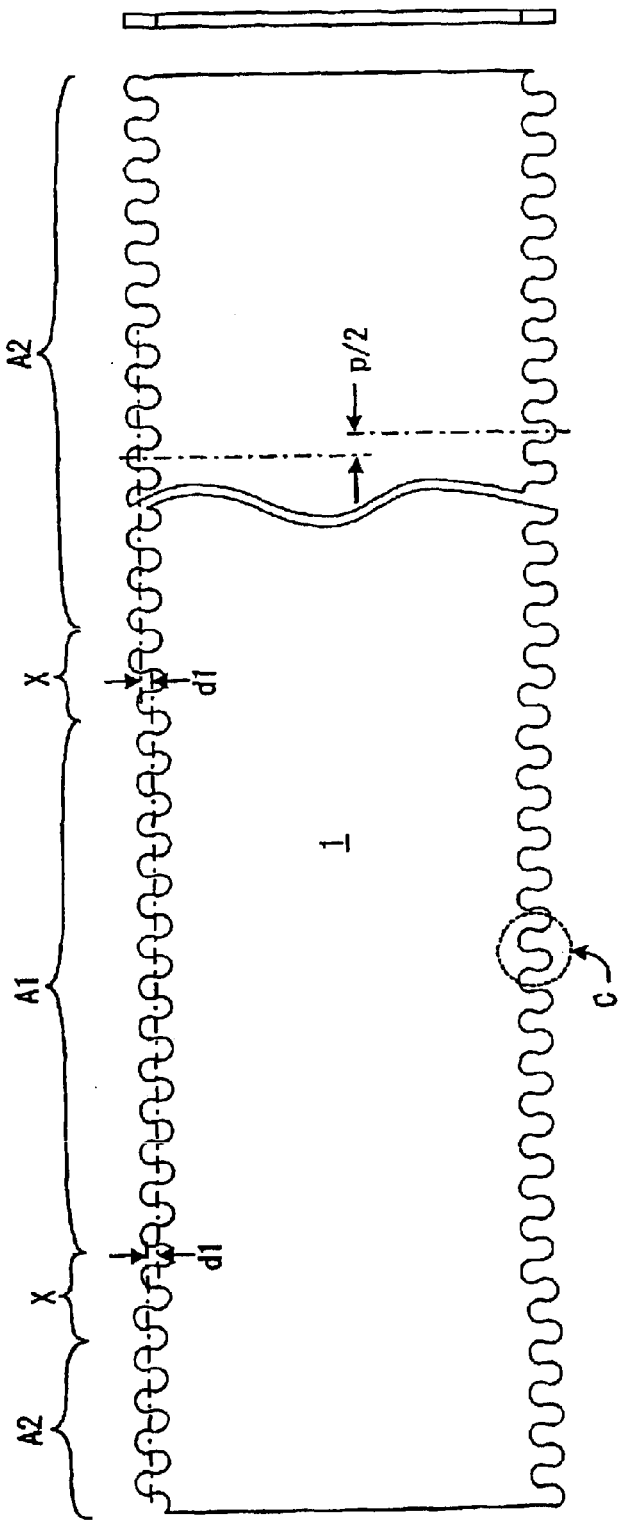
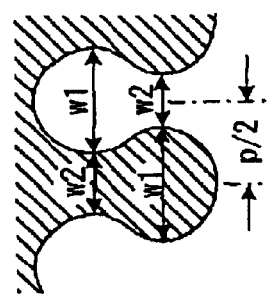
Fig.8a Fig.8b Fig.8c

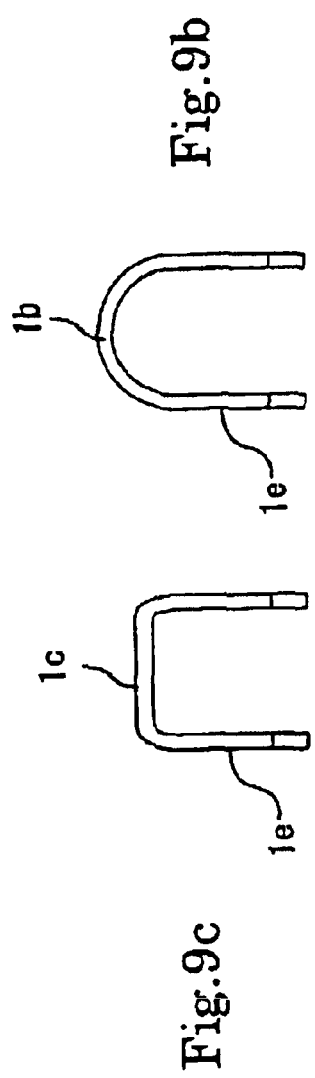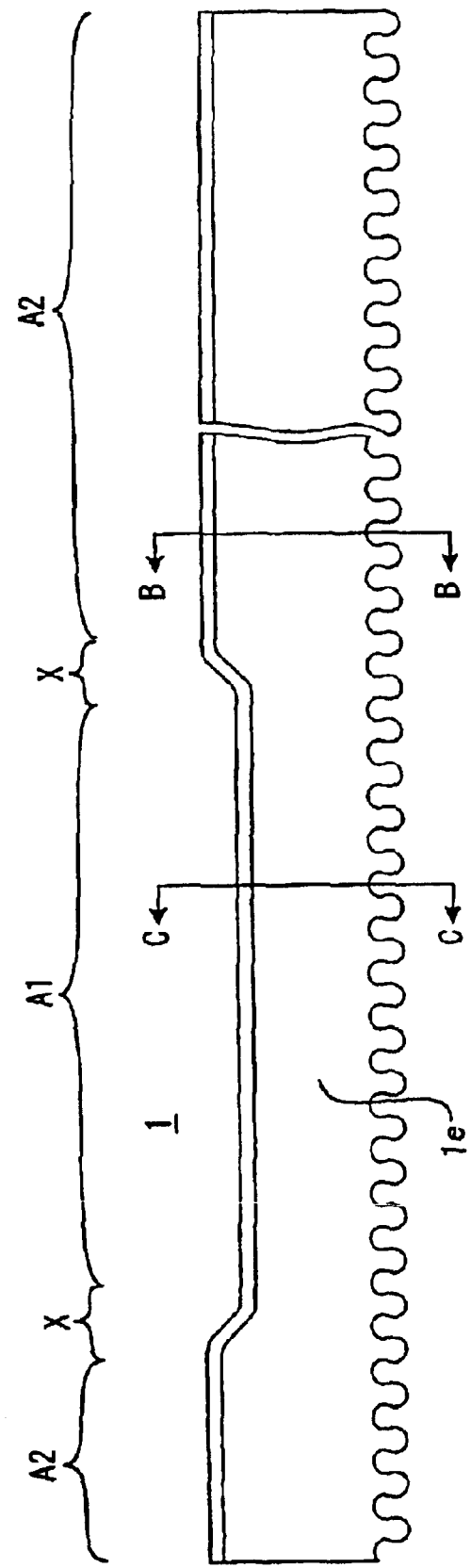

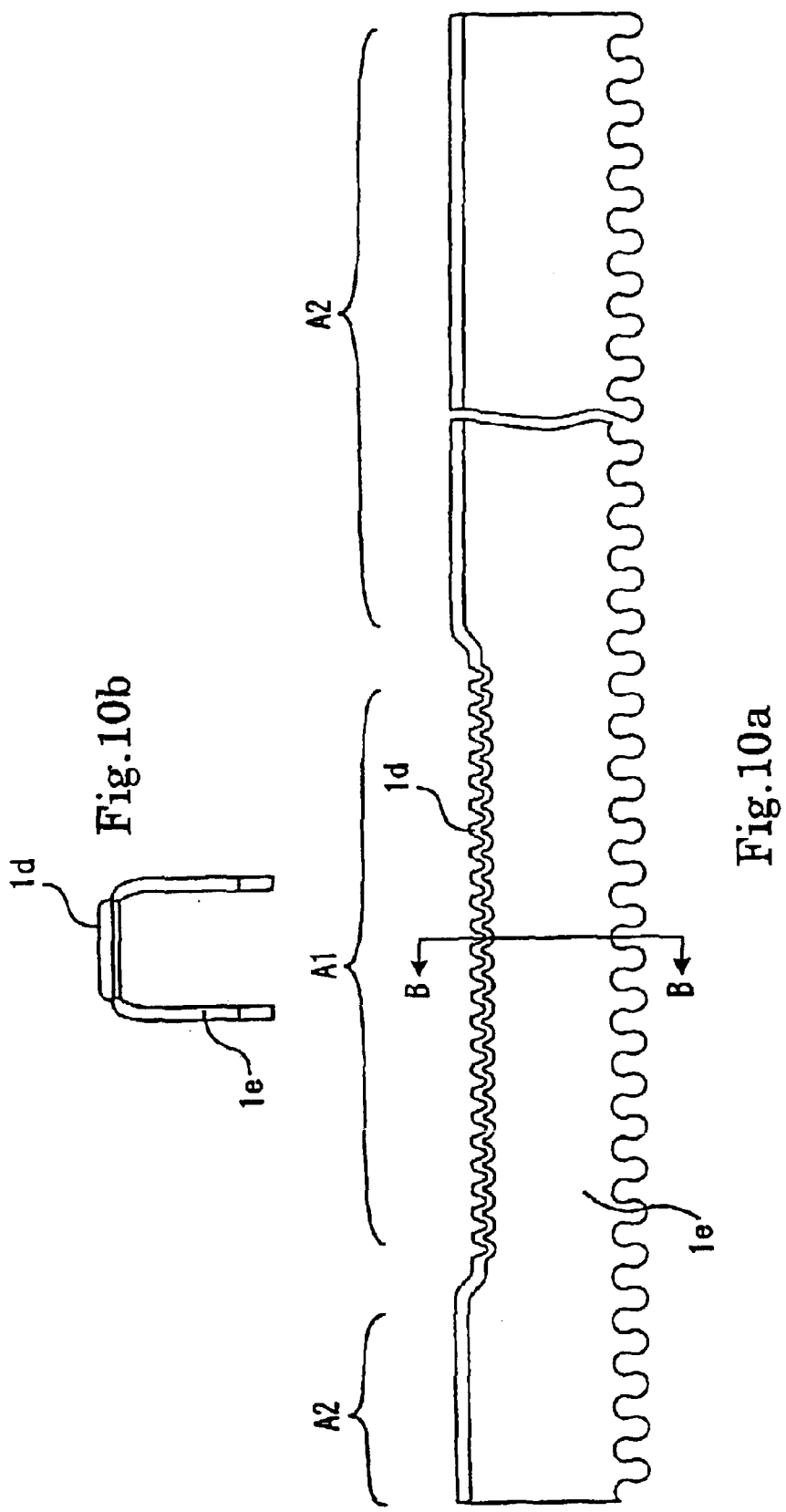

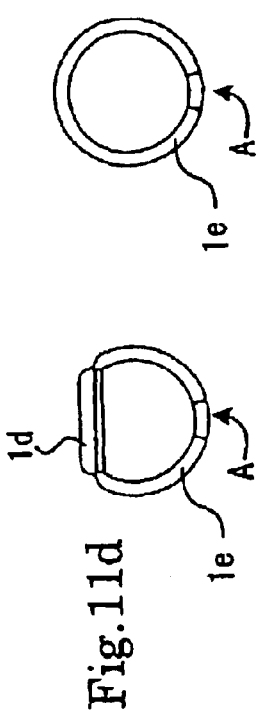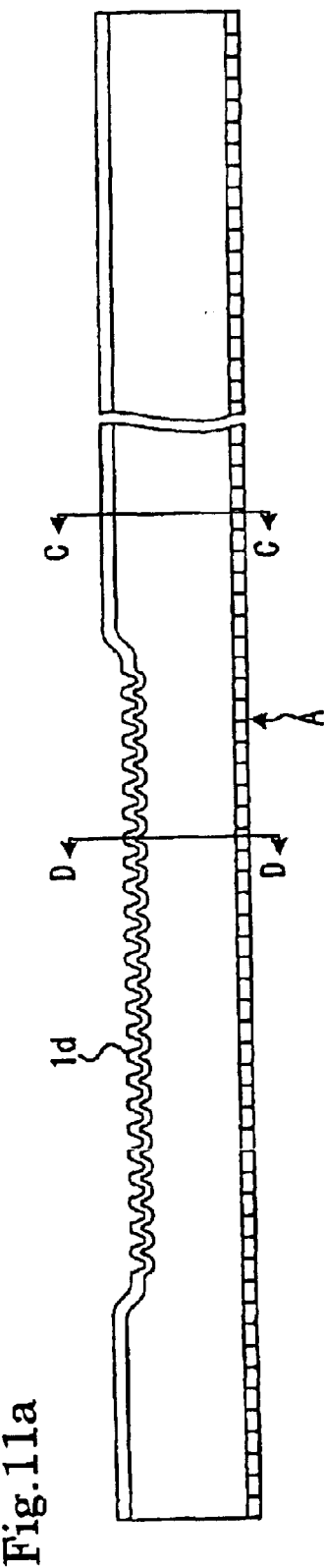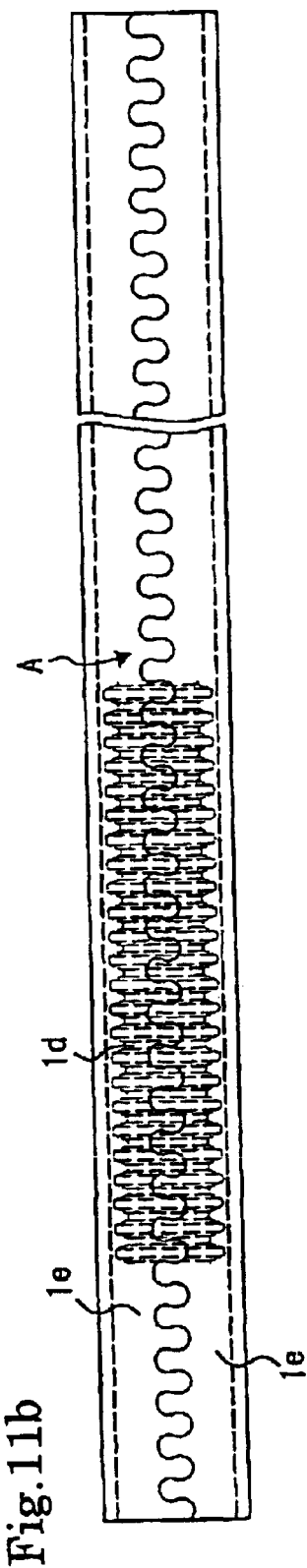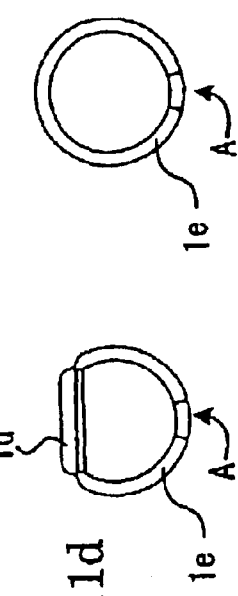
Fig.11c
Fig.11d
Fig.11a
Fig.11b

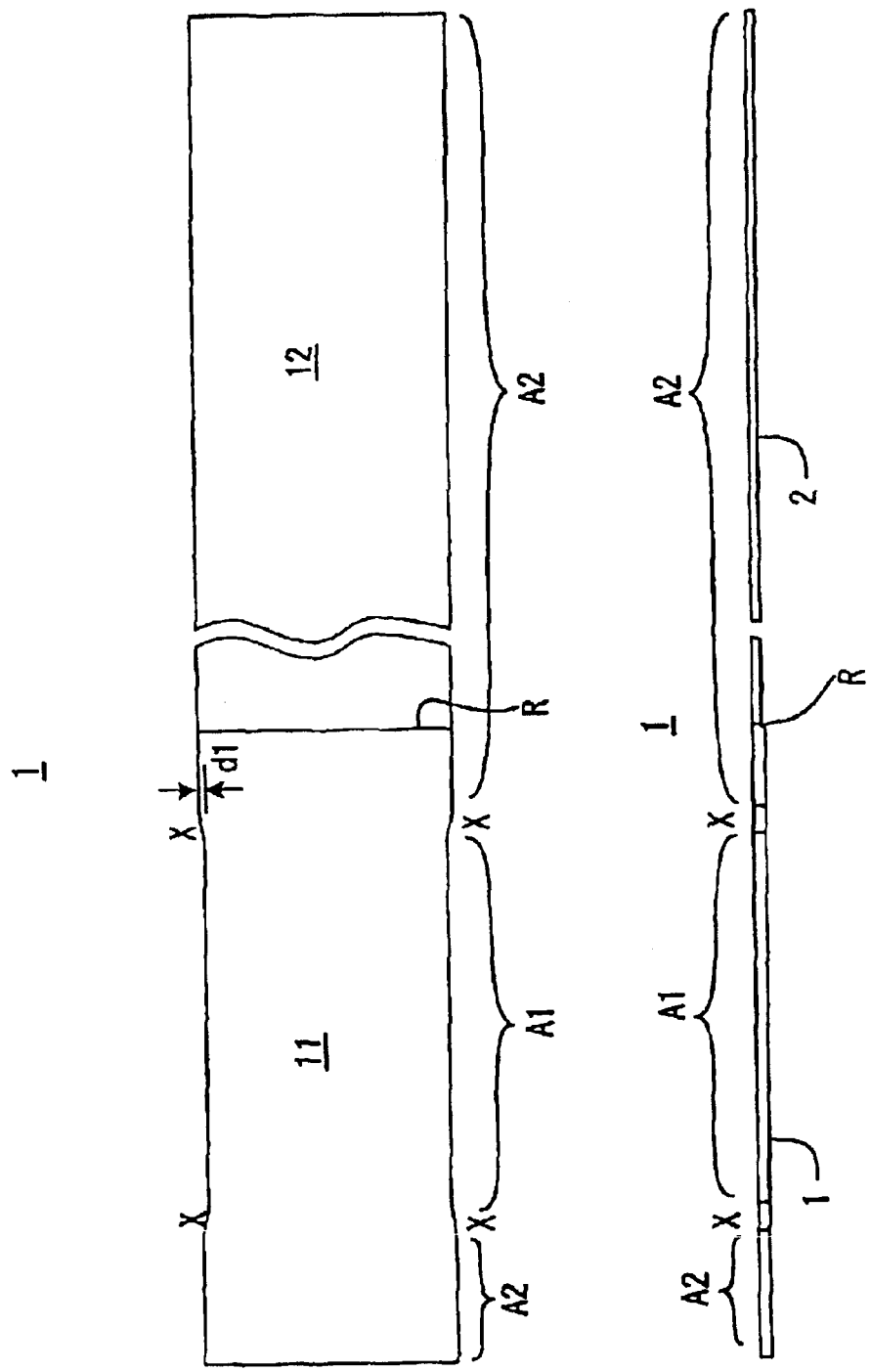

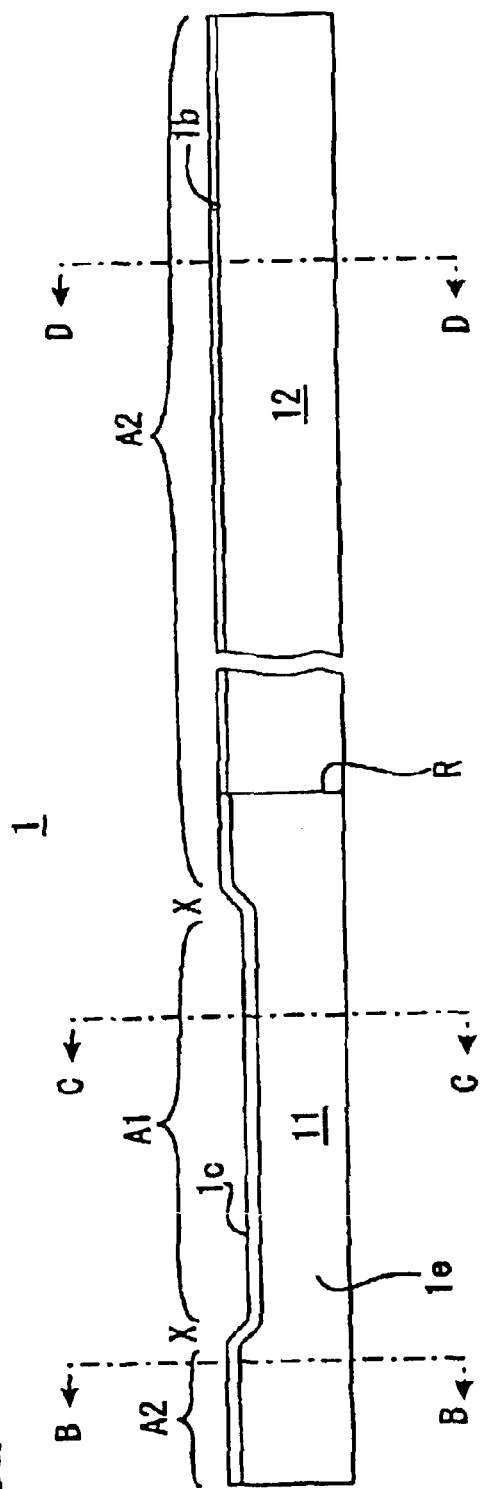
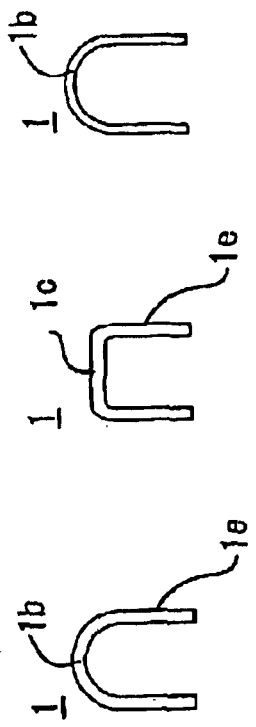
Fig.15a
Fig.15b
Fig.15c
Fig.15d

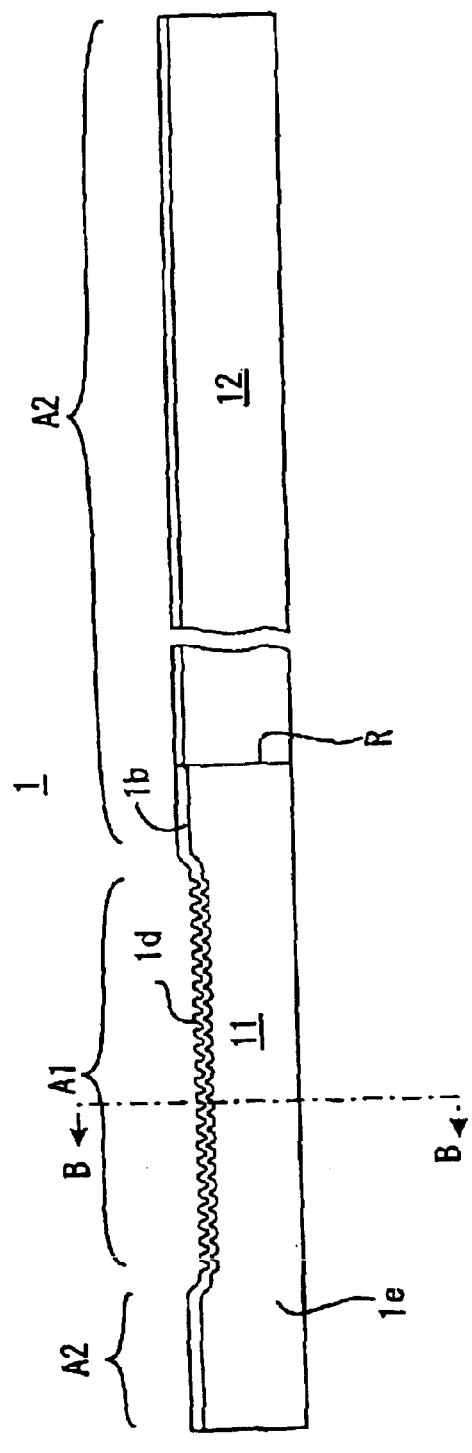
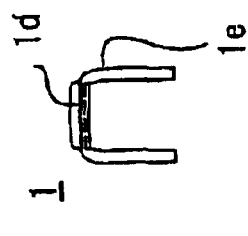
Fig.16a
Fig.16b

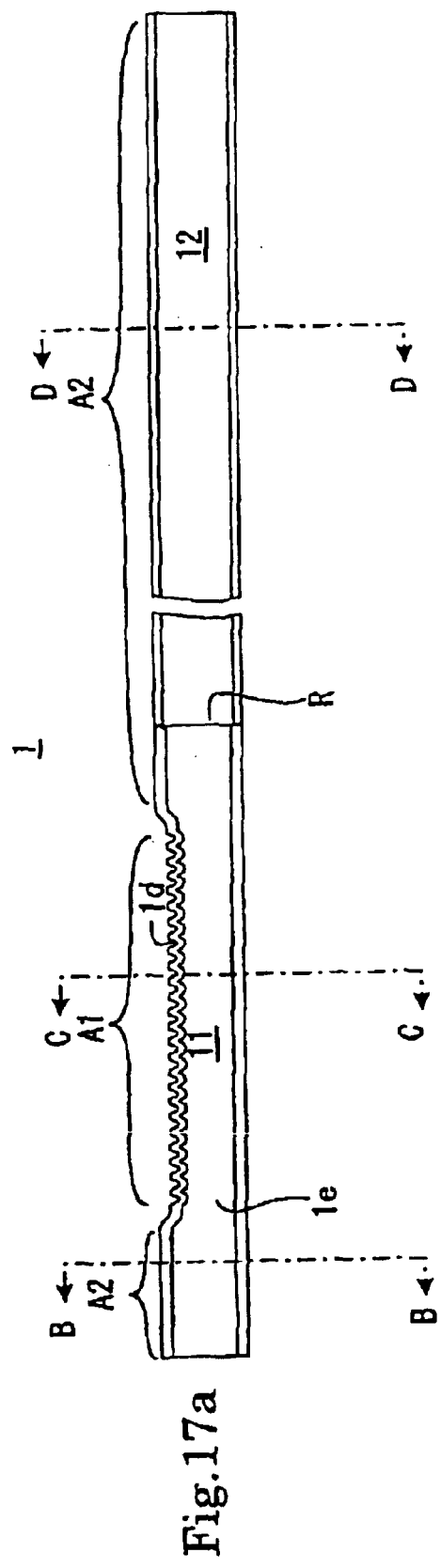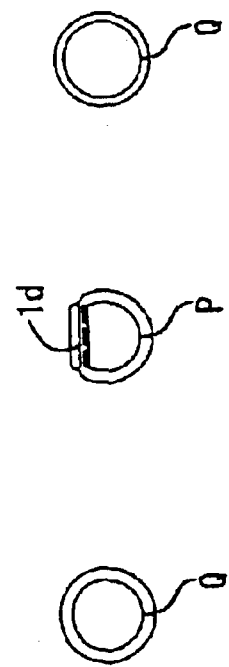
Fig.17a Fig.17b Fig.17c Fig.17d

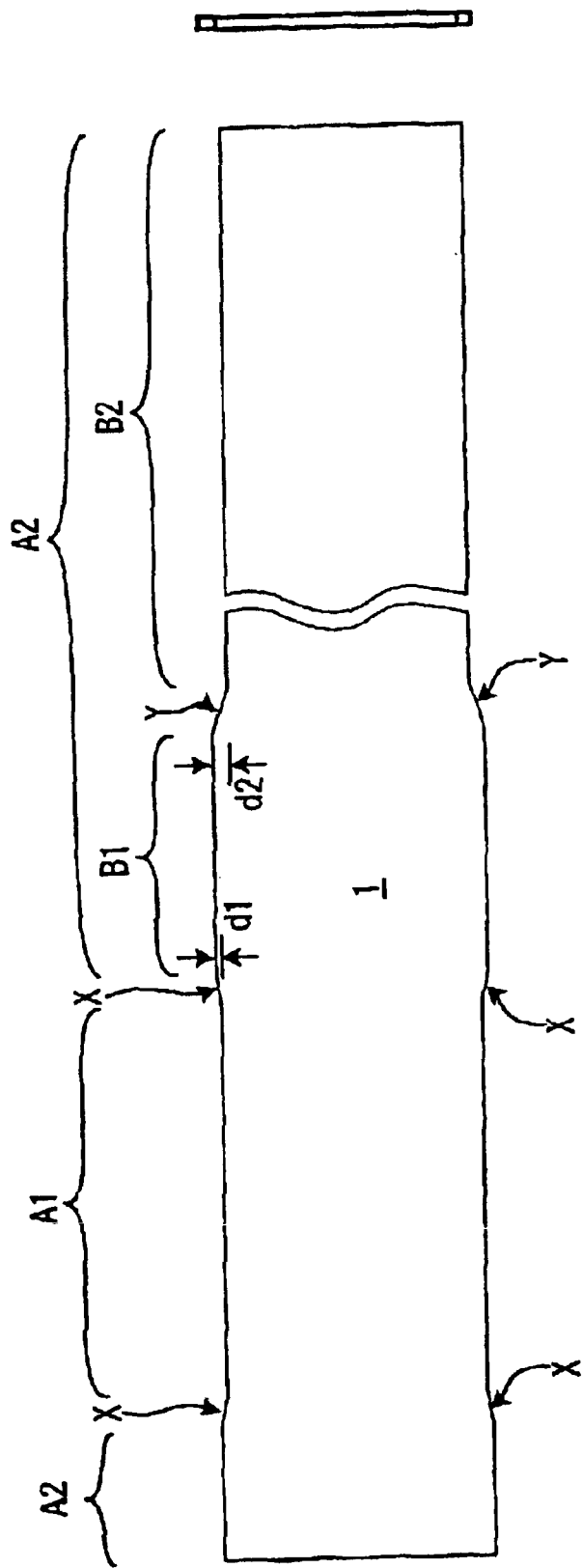

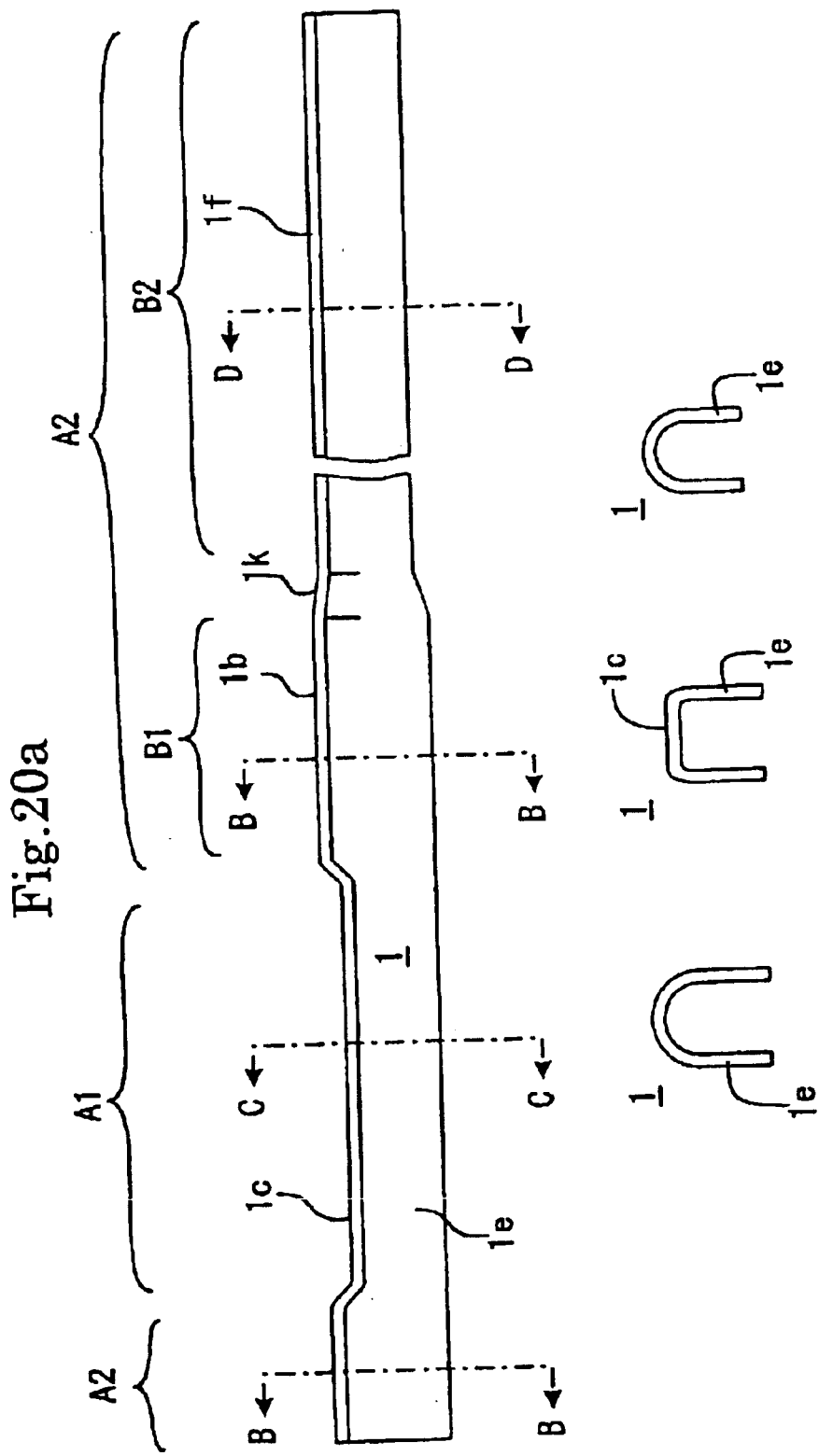

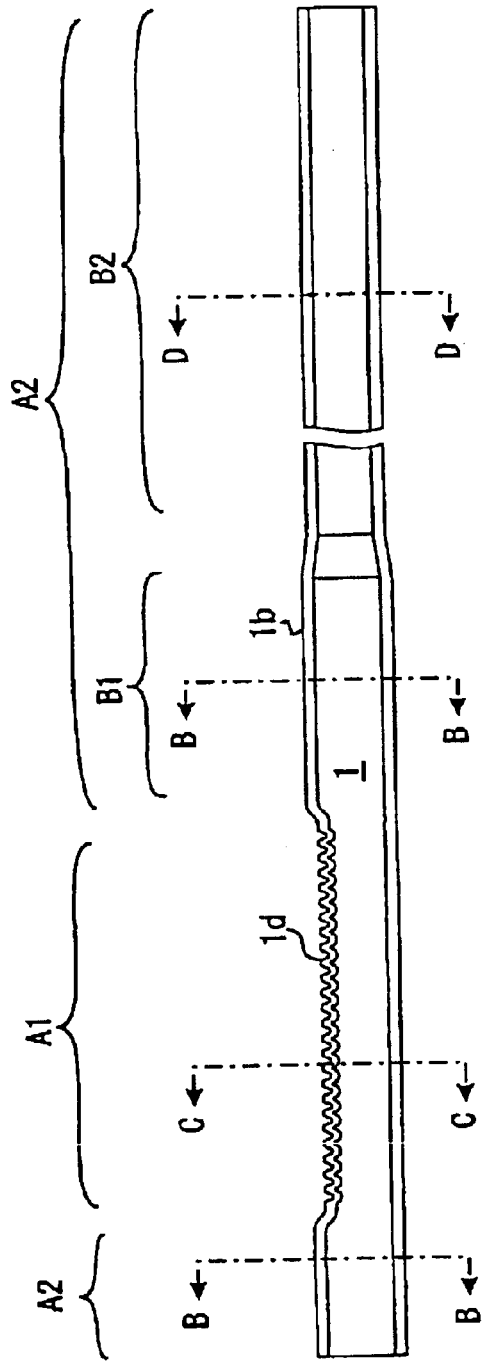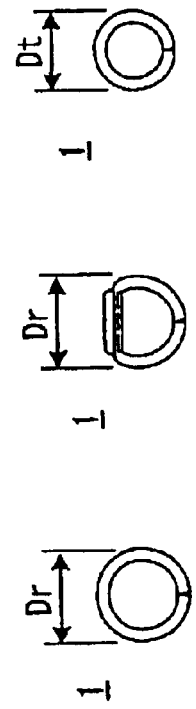
Fig.22a Fig.22b Fig.22c Fig.22d

METHOD OF MANUFACTURING HOLLOW RACK SHAFT

This application is a divisional of co-pending U.S. patent application Ser. No. 09/918,117, filed Jul. 30, 2001, hereby incorporated by reference, which is based on Japanese Patent Applications Nos. 2000-269725, 2000-269915, and 2000-236982, filed in Japan, the contents of which are hereby incorporated by reference.

BACKGROUND OF THE INVENTION

1. Field of the Invention

The present invention relates to a hollow rack shaft, particularly relates to a hollow rack shaft used for a steering system of an automobile.

2. Description of the Related Arts

A hollow rack shaft used for a steering system of an automobile and its manufacturing method are disclosed in Japanese Laid-Open Patents No. Hei 11-180318 and No. Hei 11-278287 and others. In any manufacturing method, rack teeth are formed at the bottom of a U-shaped plate bent in a gutter-like shape, and afterward, the plate is formed cylindrically by butting two open legs of the U shape. The butt portion of the cylinder is normally welded to acquire higher strength except a case that there is no problem on the strength and this cylinder is used as a hollow rack shaft.

FIGS. 1a and 1b are a top view and a sectional view showing a workpiece for manufacturing the above shaft. FIGS. 2a to 6c show the forming process from the material to the hollow rack shaft in this manufacturing method. These drawings accompanied by a, b and c are respectively equivalent to a front view of the rack shaft (the workpiece), a D—D sectional view of the part in which rack teeth are formed, and an E—E sectional view of the part in which no rack tooth is formed.

The workpiece of a substantially rectangular plate shown in FIGS. 1a and 1b, is bent into a gutter-like shape having a U-shaped part with a flat bottom in an area A1, and having a U-shaped part with a semicircular bottom in an area A2 on both sides of A1 as shown in FIGS. 2a to 2c. After a row of rack teeth is formed at the flat bottom of the gutter-shaped workpiece as shown in FIGS. 3a to 3c, the ends of two open legs of the gutter-shaped workpiece are bent inside so that they are joined as shown in FIGS. 4a to 4c. The section of the part in the area A2 becomes circular by this bending In most of cases, after the ends of these legs are mutually welded at butt portion as shown in FIGS. 5a to 5c, the workpiece becomes a hollow rack shaft shown in FIGS. 6a to 6c after finishing process.

Generally, welding has the cooling contraction problem which caused by the solidification and the contraction of melted and expanded material at cooling. Internal stress is caused by the contraction through cooling of welded part, and distortion is also caused in the whole workpiece.

FIG. 7 exaggeratingly shows the hollow rack shaft deformed in whole by the contraction through cooling of the welded part 5. As the butt-welded part 5 is located on the reverse side to the rack teeth, the warp that the contracted welded part (a weld bead) 5 is on the inside and the row of rack teeth is on the outside is caused.

At this time, as the row of rack teeth is also influenced by the deformation, the rack teeth are out of the standard of teeth profile and cannot be substantially used for a rack shaft as they are. That is, as the rack shaft also warps in the area A1 having the rack teeth and the precision of the teeth profile is deteriorated by this effect, the rack shaft cannot be normally engaged with a pinion.

Such deviation in the precision of the teeth profile of the rack can be rectified by finishing through grinding in another process. However, as the merit that plastic working has excellent productivity is lost, it is not a good policy to insert grinding process in order to rectify the teeth profile in the manufacturing process on the hollow rack shaft. Further, as welding requires the process to remove the weld bead, the number of processes and the cost for manufacturing the hollow rack shaft are increased.

Further, as the rack teeth are designed as thin as possible in consideration of the lightening, it cannot be allowed in view of the strength that the teeth are further ground by grinding.

The hollow rack shaft has further another problem. As a pinion coupled to a steering shaft is engaged with the rack teeth and steering force is transmitted from the pinion, large bending stress acts upon the dedendum of the rack teeth and high contact pressure acts upon the contact part of the surface of the rack teeth. To endure the large bending stress and the high contact pressure, the rack teeth are generally hardened up to approximately the hardness Hrc 60 by carburizing quenching or induction hardening. In the meantime, such high contact pressure and large bending stress do not act upon the part in which no rack teeth are formed.

Nevertheless, a workpiece of one thick plate made of high-priced material is used to suit to the largest load as a whole, and further, the rack shaft which is made in this method has the same diameter of the area A1 that the row of rack teeth is formed as that of the areas A2 on both sides of the area A1. As described above, in prior art, superfluous quality is given to the area A2 which receives only small load in view of the material and the dimension, and therefore, the manufactured hollow rack shaft does not achieve enough lightening and it is high-priced.

SUMMARY OF THE INVENTION

The invention provides a hollow rack shaft and its manufacturing method wherein a process for a butt weld is not required, therefore, the process of weld beads and the rectification of the welding warp are not required and in addition, the strength is the same as what is welded.

Further, the invention has the object of acquiring a low-priced and light hollow rack shaft, particularly a hollow rack shaft for a steering system and manufacturing it easily. Furthermore, the invention has an object of using an enough thick and high quality plate in order to apply enough strength to rack teeth, using a thin plate made of low-priced material for part having no rack teeth, acquiring a light and low-cost hollow rack shaft and hereby further, acquiring the useful hollow rack shaft having suitable quality a–d the balance of the strength as a whole.

A workpiece for the hollow rack shaft disclosed in this specification is a substantially rectangular plate. The opposite two sides of this workpiece have complementary profiles each of which is composed of the continuation of a convex portion and a concave portion. When the workpiece is formed cylindrically, the profiles are mutually engaged. As the size of the widest part of the convex portion is wider than that of the narrowest part of the concave portion, the above-mentioned two sides are prevented from being detached after engagement. Further, the opposite convex portion and concave portion are mutually caulked, and hereby, respective gap is filled up.

A workpiece for another hollow rack shaft disclosed in this specification is one plate acquired by welding a first plate for a rack teeth area for a row of rack teeth to be formed and a second plate for the other area. For the first plate, a plate thicker than the second plate and/or a plate made of more satisfactory material in hardenability are/is used.

Further another hollow rack shaft disclosed in this specification is provided with a first area and a second area on both sides of it. In the first area, a row of rack teeth and a semi-cylindrical part on the reverse side are formed, the second area is fully cylindrical and on at least one side of the second area, apart different from the semi-cylindrical part in the first area and having a particularly small diameter is formed.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and together with the description, serve to explain the principles of the invention.

FIGS. 1a and 1b are a top view and a sectional view showing a workpiece for manufacturing a hollow rack shaft;

FIGS. 2a to 6c are explanatory drawings for explaining the process that the hollow rack shaft is manufactured based upon the workpiece drawings accompanied by a, b and c are respectively equivalent to a front view of the rack shaft (the workpiece), a sectional view on line D—D of the part in which rack teeth are formed, and a sectional view on line E—E of the part in which the rack teeth are not formed;

FIGS. 8a to 8c are respectively a top view showing a workpiece used in a first embodiment, a side view showing the workpiece and an enlarged view of a part c in FIG. 8a;

FIGS. 9a to 9c show the shape of a plate 1 after a first process in the first embodiment, and are respectively a front sectional view, a sectional view on line B—B in FIG. 9a and a sectional view on line C—C in FIG. 9a;

FIGS. 10a and 10b show the shape of a workpiece 1 after a second process in the second embodiment, and are respectively a front sectional view showing the workpiece 1 after rack teeth are formed and a sectional view on line B—B in FIG. 10a;

FIGS. 11a to 11d show the shape of the workpiece 1 after the third process in the first embodiment, and are respectively a front sectional view, a bottom view, a sectional view on line C—C and a sectional view on line D—D in FIG. 11a;

FIGS. 12a to 12c are respectively an enlarged view of the vicinity of a connection A after caulking in the first embodiment, a sectional view on line B—B in FIG. 12a and a sectional view on line C—C in FIG. 12a;

FIGS. 14a and 14b are respectively a top view and a front view showing a workpiece used in the second embodiment;

FIGS. 15a to 15d are respectively a front sectional view showing the workpiece 1 after the first process in the second embodiment, a sectional view on line B—B, a sectional view on line C—C and a sectional view on line D—D;

FIGS. 16a and 16b are respectively a front sectional view showing the workpiece 1 after the second process in the second embodiment and a sectional view on line B—B;

FIGS. 17a to 17d are respectively a front sectional view showing the workpiece 1 after a third process in the second embodiment, a sectional view on line B—B, a sectional view on line C—C and a sectional view on line D—D;

FIGS. 19a and 19b are respectively a top view and a side view showing a workpiece 1 used in a third embodiment;

FIGS. 20a to 20d are respectively front sectional view showing the workpiece 1 after a first process in the third embodiment, a sectional view on line B—B, a sectional view on line C—C and a sectional view on line D—D;

FIGS. 22a to 22d are respectively a front sectional view showing the workpiece 1 formed in the shape of a hollow cylinder in the third embodiment, a sectional view on line B—B, a sectional view on line C—C and a sectional view on line D—D.

DESCRIPTION OF THE PREFERRED EMBODIMENTS

First Embodiment

Figure 7:
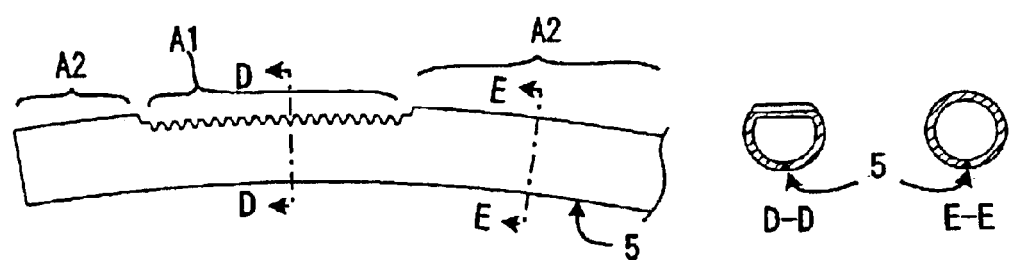
FIG. 7 exaggeratedly shows the hollow rack shaft deformed in whole by the contraction through cooling of welded parts.

FIGS. 8a to 8c are respectively a top view and a side view showing a workpiece used in this embodiment, and an enlarged view of a part c in FIG. 8a. A workpiece 1 is, as a whole, a substantially rectangular plate acquired by blanking or laser cutting from coiled metal. The opposite two sides have complementary profiles composed of the continuation of a convex portion and a concave portion. As the phase of a convex portion and a concave portion is offset by a half of pitch p, the two sides can be mutually engaged in the relation of a male and a female. The two engaged sides of the workpiece 1 are not detached because the maximum width w1 of a convex portion and a concave portion is larger than the width w2 of the neck of the convex portion and the concave portion.

This workpiece 1 has an area A1 in which a row of rack teeth is to be formed, an area A2 in which no row of rack teeth is formed and four transition areas X between these two areas (respectively when viewed along the length of the plate) as shown in FIG. 8a. In the transition area X between the area A2 and the area A1, the width of the workpiece 1 is made narrow by d1 on one side by degrees. As described above, when the workpiece 1 is completed as a rack shaft, the volume of the workpiece in each area is balanced by adjusting the width of the workpiece 1 in the area A1 and the area A2.

FIGS. 9a to 9c show the contour of the plate 1 after the first process and are respectively a front sectional view, a sectional view on line B—B in FIG. 9a and a sectional view on line C—C in FIG. 9a.

In the first process, the workpiece 1 is bent into a gutter-like shape by press. The area A1 in which the row of rack teeth would be formed has a U-shaped section having a flat bottom 1c and a pair of legs 1e respectively shown in FIG. 9c, and the area A2 in which no row of rack teeth is formed has a U-shaped section having a pair of legs 1e and a round bottom 1b respectively shown in FIG. 9b.

In the second process, rack teeth are formed at the flat bottom of the workpiece 1 by press. FIGS. 10a and 10b show the shape of the workpiece 1 after the second process and are respectively a front sectional view showing the workpiece 1 after rack teeth are formed and a sectional view on line B—B in FIG. 10a.

The row of rack teeth 1d is formed by approaching the upper die having teeth equivalent to the row of rack teeth to the lower die having a corrugated shape corresponding to the rack teeth of the upper die under the state that the workpiece 1 is placed between these dies. Then, the shape of the two dies is transferred on the flat bottom of the workpiece 1.

In the third process, the workpiece 1 is formed cylindrically by bending the two legs 1e inside. FIGS. 1a to 11d show the shape of the workpiece 1 after the third process and are respectively a front sectional view, a bottom view, a sectional view on line C—C in FIG. 11a and a sectional view on line D—D. Two legs 1e shown in FIGS. 10a and 10b are bent inside so that a concave portion and a convex portion are mutually engaged. As the legs 1e are mutually combined by the engagement of the concave portion and the convex portion, the butt welding as conventional is not required and even if a load is applied to the rack shaft, the legs 1e are not detached.

The two legs 1e engage more stiffly by caulking the vicinity of a connection A as the concave portion touches the convex portion which is engaged with it without clearance, and consequently, there is no gap.

Figure 12A:
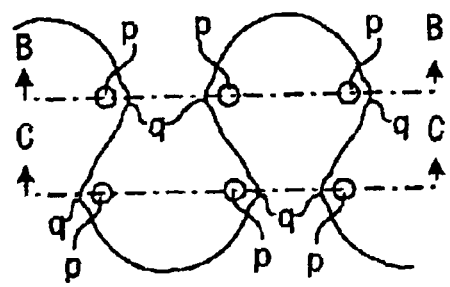
Figure 12B:
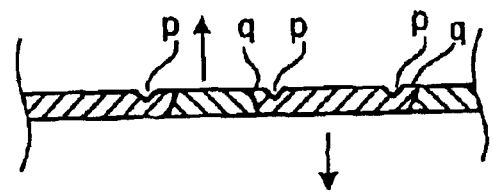
Figure 12C:
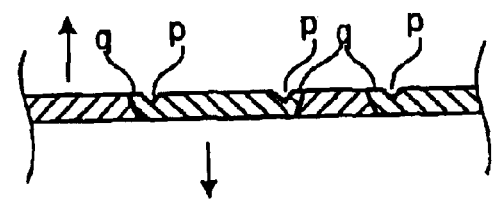

FIGS. 12a to 12c are respectively an enlarged view of the vicinity of the connection A which was caulked, a sectional view on line B—B in FIG. 12a and a sectional view on line C—C in FIG. 12a. In the vicinity of a boundary between opposite convex portions, a substantially conical indent p is made. A part q of the material of one convex portion is deformed by impressing as the part covers the other convex portion. This deformation prevents the gap between the convex portion and the concave portion, and that the convex portion falls off in a direction shown by arrow.

Figure 13A:
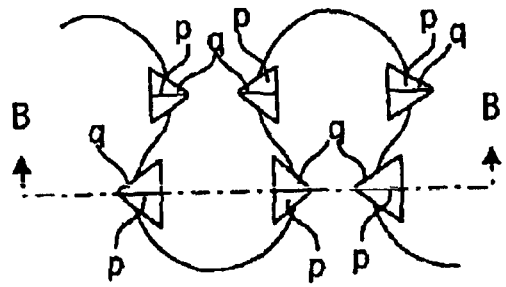
FIGS. 13a and 13b show another example of caulking in the first embodiment, and are respectively an enlarged top view showing a convex portion and a sectional view on line B—B.
Figure 13B:
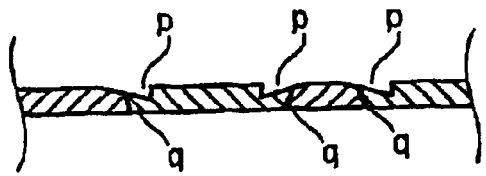

FIGS. 13a and 13b show another example of caulking and are respectively an enlarged top view of a convex portion and a sectional view on line B—B. In this example, the gap and the falling off of the convex portions are prevented by making an impression p in the shape of a distorted triangular pyramid across a boundary and causing deformation q on the boundary.

Caulking described in the above-mentioned examples is arbitrary and the above-mentioned convex portion (therefore, the concave portion) is not limited to the one shown in the drawings and if only a convex portion and a concave portion can be engaged, they may have an arbitrary shape.

Afterward, carburizing quenching or induction hardening is applied to the row of rack teeth to give the required strength of the surface of teeth and both ends are finished as shown in FIG. 6a to be a product. In a halfway process, the bend of the rack shaft can be suitably rectified if necessary.

Second Embodiment

FIGS. 14a and 14b are respectively a top view and a front view showing a workpiece used in a second embodiment. The plate workpiece 1 used in the second embodiment is one substantially rectangular plate as a whole acquired by welding the two plate workpieces 11 and 12 which are different in the material and/or the thickness at a weld R. For the workpiece 11, the material that enables carburizing quenching such as Scr and SCM or carbon steel suitable for induction hardening can be used and the workpiece 11 is made thicker than the workpiece 12 so that a row of rack teeth to be formed has enough strength.

As the weld R is hardened by the heat of a weld, it is annealed to get rid of bad effect upon later forming. The workpiece 1 has an area A1 in which the row of rack teeth is formed, an area A2 in which no row of rack teeth is formed and a transition area X in which transition by d1 from the area A1 to the area A2 as in the first embodiment.

FIGS. 15a to 15d are respectively a front sectional view showing the workpiece 1 after the first process, a sectional view on line B—B, a sectional view on line C—C and a sectional view on line D—D. In the first process, the workpiece 1 is bent into a gutter-like shape having a U-shaped section as a whole. As in the first embodiment, any section has a pair of legs 1e, the area A1 has the section of a flat bottom 1c and the area A2 has the section of a round bottom 1b.

FIGS. 16a and 16b are respectively a front sectional view showing the workpiece 1 after the second process and a sectional view on line B—B. In the second process, as in the first embodiment, a row of rack teeth 1d is formed at the flat bottom 1c of the workpiece 1.

FIGS. 17a to 17d are respectively a front sectional view showing the workpiece 1 after the third process, a sectional view on line B—B, a sectional view on line C—C and a sectional view on line D—D. In the third process, the ends of two legs 1e are bent inside as they are joined. The workpiece 1 is butted cylindrically. In the case that strength is required for the rack shaft, the ends are welded in butt parts P and Q.

Afterward, the workpiece 1 substantially having the shape of the rack shaft is finished by machining, the carburizing quenching of the row of rack teeth and the other location and finishing through grinding and is shipped as a hollow rack shaft.

Figures 18A, 18B:
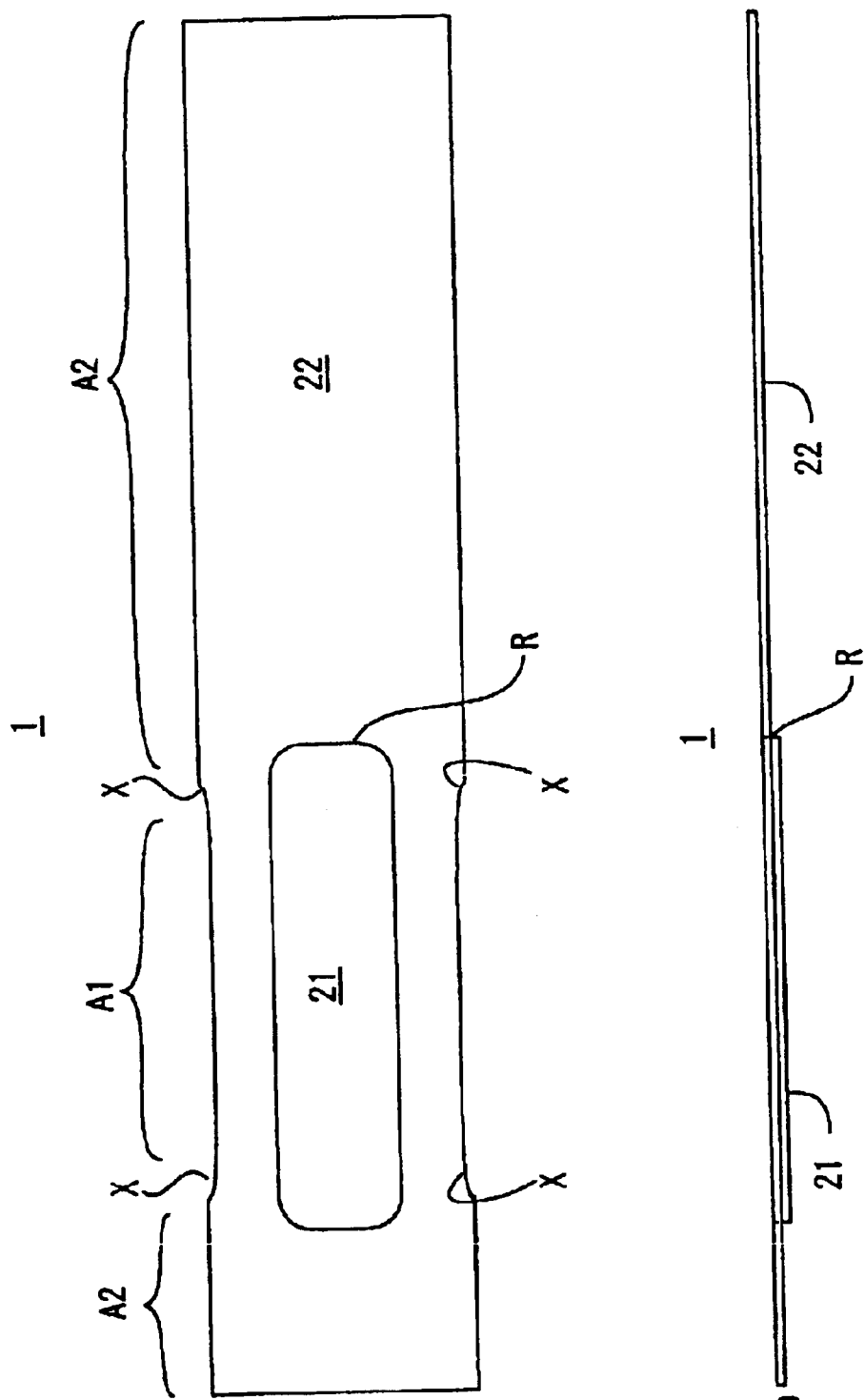
FIGS. 18a and 18b show a different example of the workpiece 1 in the second embodiment, and are respectively a top view and a side view showing the workpiece 1.

FIGS. 18a and 18b show a different example of the workpiece 1 in the second embodiment and are respectively a top view and a side view respectively showing the workpiece 1. The workpiece 1 is acquired by fitting material 21 for forming a row of rack teeth in a hole of material 22 and welding them. As in the above-mentioned examples, for the material 21, the material that enables carburizing quenching such as Scr and SCM or carbon steel suitable for induction hardening can be used and the material 21 is thickened, compared with the material 22 so that the row of rack teeth to be formed later has enough strength. In this example, only the workpiece 1 is different, and the first to third processes are substantially similar to those in the above-mentioned examples.

In the second embodiment, as high-priced and high quality as excellent in hardenability and enough thickness steel can be used only in a part and the vicinity in which the row of rack teeth is formed, the light and low-priced hollow rack shaft can be manufactured.

Third Embodiment

FIGS. 19a and 19b are respectively a top view and a side view respectively showing a workpiece 1 used in a third embodiment. The workpiece 1 is one substantially rectangular plate as a whole and is similar to the workpiece in the first and second embodiments about the point that the workpiece 1 in the third embodiment also has an area A1 in which a row of rack teeth is formed, areas A2 in which no row of rack teeth is formed and a transition area X. However, in the third embodiment, the area A2 further has a wide partial area B1, a partial area B2 narrower than the area B1 by d2 on one side and a transition area Y.

A large load is applied to the vicinity of the row of rack teeth of a rack shaft, while a very large load is not applied to a part apart from the row of rack teeth. Therefore, the diameter in this part of the rack shaft can be much smaller than the present. Accordingly, in the third embodiment, the diameter of a part of the completed rack shaft is reduced by narrowing the width of a part of the workpiece 1, that is, the width of the partial area B2 and the weight is reduced.

FIGS. 20a to 20d are respectively a front sectional view showing the workpiece 1 after the first process, a sectional view on line B—B, a sectional view on line C—C and a sectional view on line D—D. In the first process, the workpiece 1 is bent into a gutter-like shape having a U-shaped section as a whole. As in the first and second embodiments, each section has a pair of legs 1e, a flat bottom 1c in the area A1 and a round bottom 1b in the area A2. However, as different from the first and second embodiments, the U-shaped sections which have different size are formed in the partial areas B1 and B2 in the area A2. In the transition area Y, the size of U-shaped sections varies by degrees.

Figure 21A:
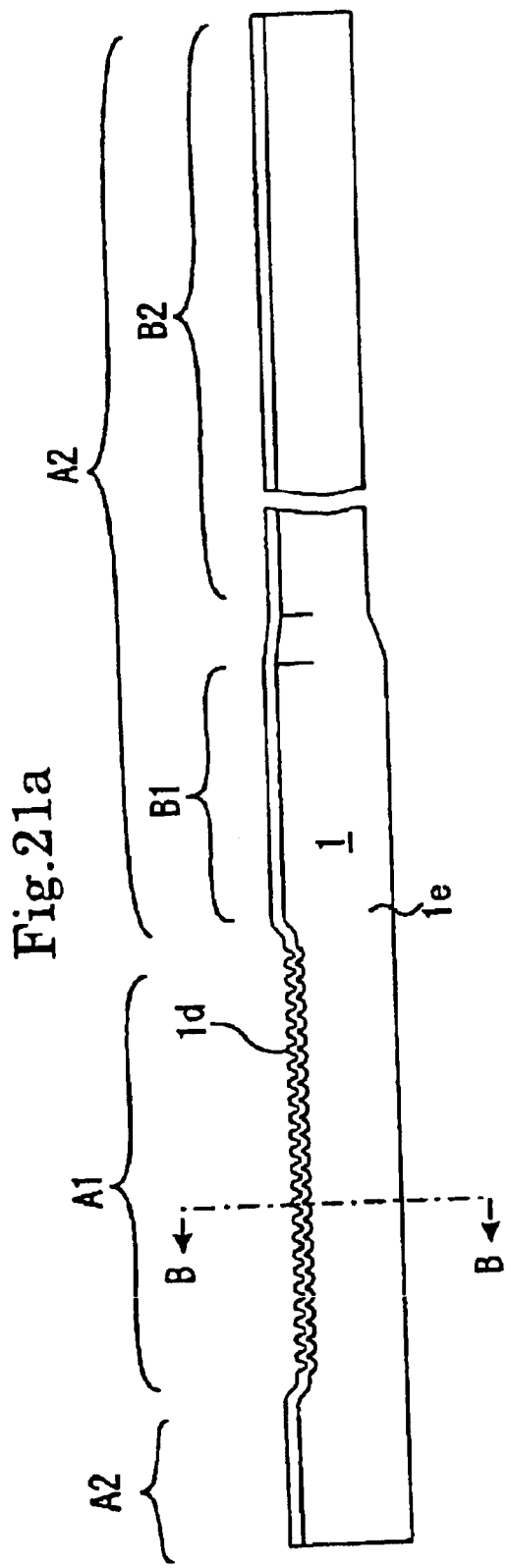
FIGS. 21a and 21b are respectively a front sectional view showing the workpiece 1 after a second process in the third embodiment and a sectional view on line B—B.
Figure 21B:
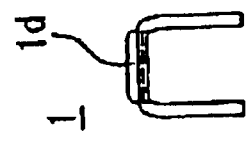

FIGS. 21a and 21b are respectively a front sectional view showing the workpiece 1 after a second process in the third embodiment and a sectional view on line B—B. In the second process, as in the first and second embodiments, a row of rack teeth 1d is formed at a flat bottom 1c of the workpiece 1.

In the third process, the hollow cylindrical workpiece 1 is acquired by bending a pair of legs 1e so that they are joined. FIGS. 22a to 22d are respectively a front sectional view showing the workpiece 1 formed in the shape of a hollow cylinder, a sectional view on line B—B, a sectional view on line C—C and a sectional view on line D—D. The outside diameter in the sectional views on lines B—B and C—C is Dr and the outside diameter in the sectional view on line D—D is Dt that is shorter than Dr. The whole is lightened without the effect on the strength of the rack shaft by reducing the outside diameter in the partial area B2 as described above.

Afterward, the joined parts of the workpiece 1 substantially having the shape of the rack shaft are welded if necessary, the workpiece is finished by machining, the carburizing quenching of the row of rack teeth and the other location and grinding and is shipped as a hollow rack shaft.

In the third embodiment, the whole is lightened without the effect on the strength of the rack shaft by reducing the outside diameter in the partial area B2 as described above.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A method of manufacturing a hollow rack shaft comprising:
    providing a substantially rectangular plate;
    forming complementary profiles composed of the continuation of a convex portion and a concave portion along opposing long sides of said plate so that a first portion of said plate is narrower than a second portion of said plate;
    forming said plate into a channel;
    forming a rack in said first portion; and
    forming said channel into a hollow shaft so that the complementary profiles on said long sides engage each other.

2. A method of manufacturing a hollow rack shaft according to claim 1, further comprising caulking said convex portion and/or said concave portion of said joined sides to deform a boundary between adjacent convex and concave portions.

3. The method of claim 1, wherein a portion of the hollow shaft proximate to said rack has a D-shaped cross section and a portion distal from the said rack has a O-shaped cross section.

4. The method of claim 1, wherein providing the rectangular plate comprises:
    providing a first plate;
    providing a second plate; and
    joining the first and second plates in an edge-to-edge fashion so that the first plate corresponds to the first portion of the rectangular plate and the second plate corresponds to the second portion of the rectangular plate.

5. The method of claim 4, wherein joining the first and second plates comprises welding said first and second plates together.

6. The method of claim 4, wherein the first plate is thicker than said second plate.

7. The method of claim 4, wherein the first and second plates are of different materials.

8. The method of claim 1, wherein providing the rectangular plate comprises:
    providing a first plate;
    providing a second plate defining an aperture; and
    deposing the first plate in the aperture so that said first plate is parallel to said second plate.

9. The method of claim 8, wherein joining the first and second plates comprises welding said first and second plates together.

10. The method of claim 9 wherein the first plate is thicker than said second plate.

11. The method of claim 9 wherein the first and second plates are of different materials.

12. A method of manufacturing a hollow rack shaft comprising:
    providing a rectangular plate;
    forming a row of rack teeth in a part of said substantially rectangular plate; and
    cylindrically deforming said rectangular plate by bending it so that the parallel two sides are joined,
    wherein said rectangular plate comprises a first plate joined to a second plate and said rack teeth are formed in at least a portion of said first plate.

13. A method of manufacturing a hollow rack shaft according to claim 1, wherein:
    said first plate is thicker than said second plate.

14. A method of manufacturing a hollow rack shaft according to claim 1, wherein:
    said first plate is made of material more satisfactory in hardenability than that of said second plate.

15. A method of manufacturing a hollow rack shaft, comprising:
    providing a plate with a first area having a narrower width than a second area;
    forming in said first area, a row of rack teeth;
    deforming said plate to form a hollow shaft having a semi-cylindrical cross section in said first area and a cylindrical cross section in said second area so that said second area has a diameter that is different from the diameter of the semi-cylindrical part in said first area.

* * * * *

UNITED STATES PATENT AND TRADEMARK OFFICE
CERTIFICATE OF CORRECTION

PATENT NO. : 6,782,598 B2
DATED : August 31, 2004
INVENTOR(S) : Akira Tsubouchi et al.

It is certified that error appears in the above-identified patent and that said Letters Patent is hereby corrected as shown below:

Title page, Item [54] and Column 1, line 2,
delete the title "METHOD OF MANUFACTURING HOLLOW RACK SHAFT", and insert -- HOLLOW RACK SHAFT --.

Column 1,
Line 46, delete "bending In", and insert -- bending. In --.

Column 8,
Lines 50 and 53, delete "claim 1", and insert -- claim 12 --.

Signed and Sealed this

Twenty-fifth Day of January, 2005

JON W. DUDAS
*Director of the United States Patent and Trademark Office*